APPARATUS FOR SAFEGUARDING INFORMATION

Filed Sept. 6, 1963 4 Sheets-Sheet 1

INVENTOR.
FREDUN ANTHONY MALIK
BY R.B. Coleman
ATTORNEY

INVENTOR.
FREDUN ANTHONY MALIK
BY R. B. Coleman, Jr.
ATTORNEY

APPARATUS FOR SAFEGUARDING INFORMATION

Filed Sept. 6, 1963 4 Sheets-Sheet 3

INVENTOR.
FREDUN ANTHONY MALIK

BY R B Coleman

ATTORNEY

Aug. 30, 1966 F. A. MALIK 3,269,256

APPARATUS FOR SAFEGUARDING INFORMATION

Filed Sept. 6, 1963 4 Sheets-Sheet 4

INVENTOR.
FREDUN ANTHONY MALIK

BY R. B. Coleman Jr.

ATTORNEY

United States Patent Office 3,269,256
Patented August 30, 1966

3,269,256
APPARATUS FOR SAFEGUARDING INFORMATION

Fredun Anthony Malik, 900 W. Bonanza Road, Las Vegas, Nev.

Filed Sept. 6, 1963, Ser. No. 307,188
3 Claims. (Cl. 88—24)

This invention relates broadly to recording and preserving information. In one of its aspects, this invention relates to an apparatus to (a) maintain surveillance, (b) insure an undeviating and rigid procedure for handling, (c) preserve the accuracy, with complete fidelity, (d) provide physical safeguarding, and (e) prevent deliberate or accidental errors or acts of dishonesty in the handling of information, receipts or other records of various types. In another but more limited aspect, this invention relates to a controlled sequential procedural system which rigidly monitors the handling of information, is operative only when a pre-determined sequence of handling of information is followed, and which "locks" against deviations from such sequence when it is violated, either deliberately or accidentally, and which may, if desired, put out visual or audible signals showing either that the correct procedure or sequence is being followed, or that the correct procedure is being violated.

The apparatus is designed to insure the recording of data, drawings, hospital records, legal documents, sales transactions, and all such items, as well as the recording of the date and time and certain other useful information connected therewith. The apparatus is further designed to eliminate the hazard of loss, misplacement, alteration or deliberate dishonesty in respect to such information. It provides an absolute and infallible protection, for example, against any attempt at collusion on the part of personnel involved in the handling of such information, or misrepresentation of the sequence of events followed in such handling.

The storage and handling of information such as described above in modern civilization represents one of the most complex and essential facets of art, business, science, and day to day life. Honest and accurate handling of such information may be to the best interest of individuals in every walk of life, or those of businesses and industries, or those of local, State and Federal Government. In every line the common problem exists of insuring against error, deliberate or accidental. One could therefore cite hundreds of applications for the apparatus of this invention, where benefits would serve, to one degree or another, all involving directly or indirectly, or benefiting, or depending upon, the accurate recording of such information. It is not within the scope of this disclosure to enumerate all of the variables and applications of this invention, however, the following are representative:

The recording of deeds of various types, legal files, court records, tax transactions, store sales slips, telephone call slips, hospital case histories, real estate identifications, transactions where only a limited number of participants, selected at random by honest means, will benefit financially or in other ways from their participation in such venture (illustrations of the last-mentioned being contests having prize or cash awards, various games of chance, lotteries, etc.).

Many ways have been proposed and are currently being practiced to safeguard information such as described hereinbefore. Many industries manufacture equipment or supplies whose total gross sales annually run into the hundreds of millions of dollars, all intended to provide for this. Such equipment and the attendant procedures employed in its use, all strive for accuracy and efficiency but achieve this to varying intermediate degrees. Despite the attention that has been given to obtaining complete accuracy, as of this time there is no equipment or attendant procedural system for handling thereof which is infallible—that is, either because of limitations of the equipment or the uncontrolled opportunity for the operators thereof to make errors, deliberately or accidentally, such past equipment and procedures only partially achieve the desired objective.

It is, therefore, an object of this invention to provide an apparatus for preserving data.

It is another object of this invention to provide an apparatus for recording information and assuring that such recorded information is preserved in its original form and time.

Still another object of this invention is to provide an apparatus which will detect tampering with data being recorded.

And still other objects and advantages of this invention will be apparent to one skilled in the art, having been given this invention.

This apparatus, for the first time, achieves in a relatively simple, convenient and foolproof manner the objects mentioned.

The above objects and advantages are obtained of a single frame movie camera operably connecting with means for signaling non-sequential predetermined steps.

Any attempt to describe all of the many hundreds of applications in which the apparatus can be used to advantage would require hundreds of pages of description and is therefore impractical. Instead, I have chosen to describe one embodiment and application of the apparatus which poses every problem that any other application can possibly present. In other words, the example chosen can, by one skilled in the art, be used by simple modifications in all these other fields. In some fields of application the problems are not as complex as others—that is, the number of variables involved and the environment do not present as complex a problem. To show the great scope of the apparatus in handling all such variables, as well as the key variable of human error, either deliberate or accidental, an example has been chosen for monitoring and surveillance of information wherein every element which may occur in other applications is present, along with the temptation to make error (dishonesty) because of the high financial gain that such dishonesty could accrue to the individual if it were to go undetected. For this purpose alone, the game known as Keno is described. This is a game of chance that has been known since early times, having been probably the factor which built the Wall of China, through a lottery application of the game of Keno. Keno is played very extensively in the United States and involves many thousands of individual transactions daily. As an illustration, it is generally estimated that over 500,000 individual slips recording individual transactions, these to be described more fully hereafter, must be handled, recorded, assessed, and, in the case of successful winners, payment made therefor each day of the year. Throughout the transactions involving, in this one complex game, over 180 million records per year, is a sequence of handling of such records by personnel at different levels, at each of which levels deliberate or accidental errors can take place. Superimposed upon the losses which such errors will have to the individual, the business and its proprietors, as well as its reputation, is the loss which faces the local, State and Federal Governments in respect to collecting taxes from those participants of this game of chance who are successful winners of very large sums of money. For example, it is posible in this game, and occurs frquently, that through purchase of one ticket, to be described hereafter, for the sum of one dollar ($1.00) the participant can and frequently does win as much as twenty-five thousand dollars ($25,000.00). Obviously the taxes which would benefit the local and general public from such sums of money will be considerable, and it is a matter of record that the State of Nevada, for one, and in respect to the game of Keno itself, is seriously concerned over the inability to insure completely honest and accurate collection of revenue. Similarly almost an identical problem exists, but limited as to scope and complexity of the sequence of handling involved in the vast telephone network in the United States. Every long distance phone call which is handled by an operator requires that such operator fill out a slip, pass it to some other point where it is recorded, such as microfilming machines, thereupon moved to still another point where computations are made, segregations, billings, etc. Here again it is known that collusion has taken place between operators and those placing the calls or, inadvertently, large sums of money have been lost to telephone companies because of improperly recorded or unrecorded slips.

Returning now to the example of the game of Keno, where the public and business interests have constantly been subjected to alteration of results and pertinent data and information, resulting in the dishonest transactions of large sums of money, I consider that a thorough explanation of the game itself (which is not a part of this invention, of course) will be useful in better understanding of my apparatus. Such a description, even though it relates to one particular application of the apparatus, namely the game known as Keno, involves individual points and sequences of surveillance and control as well as safeguarding of information that, in its broader form, is applicable in many other usages. By first explaining the game of Keno, then showing the individual aspects wherein either deliberately or accidentally errors can be made, or the safeguarding of the information jeopardized, I shall then show how in respect to those individual aspects the apparatus would provide the necessary and hithereto unavailable control.

In the game of Keno, the participant, hereinafter referred to as "customer" is given sheets of paper ruled to form squares horizontally and vertically, and one number is printed in each square generally such that there are eight horizontal rows, each containing ten numbers (for a total of eighty), the numbering proceeding such that in the top row that farthest to the left is the numeral "1" and the last to the right in the first row is the numeral "10," thereafter the numbering proceeding from left to right in each following horizontal row. These sheets are known as "tickets." The customer may, by his own choice, mark the number in any square, generally such as to indicate clearly his choice, generally using a brush dipped in ink or a crayon. The customer may mark as many numbers as he chooses, from 1 to 80. There are various ways in which he can make these marks, each having a unique significance from the standpoint of the game of Keno. Some marks are known as "simple" marks, constituting simply the marking of one or more numbers. Where a choice of several numbers has been made on one ticket, one or more may, in addition, be circled. In similar fashion where one or more numbers are selected, two or more may be circled as "groups." Each of these markings indicates to the management just what manner of sequence of chance, hereafter referred to as "play," with the attendant "odds" of such sequence, the customer has by his volition chosen. If he has marked his ticket simple—indicating one, two or more marks, up to fifteen—he is doing so in the hope he has chosen correctly a corresponding number of the numbers which the management will subsequently select at random (hopefully in an unbiased manner). If the customer has circled, as distinguished from simply marking, one or more of the individual numbers, he is indicating the desire to play a combination or several games at once within the same drawing by the managements. He can also circle groups of numbers which indicates to the management that the customer wishes to play many combinations within the same drawing. In the interests of brevity, a complete explanation of all sequences and their significance as to odds will not be given herein and is not pertinent. Suffice it to say that each selection, marking, circling, or grouping constitutes an individual transaction, and that the customer pays extra for each such selection. It should be readily apparent that the number of combinations which can "pay" is exceedingly great from a mathematical standpoint, and it should also be evident that the degree of surveillance and auditing required by the management to double check to insure that any particular ticket, in any of the selections thereon, constitutes a "winner," and to insure that the tickets have not been forged, altered, or otherwise manipulated, represents a very complex, normally time-consuming problem which heretofore has never been completely solved.

The customer then specifies the amount he wished to invest and the specific manner (or manners, in the event he has made more than one choice) in which he chooses to make his investment. This is done by the customer who, familiar with the game, makes a notation in the marginal or unprinted area of the ticket which conveys understanding to the management both as to the combinations and the amount he wishes to pay. The customer takes the marked ticket to a proprietor-representative who copies the customer's markings on a generally similar "duplicate," on which, in addition, the number of the game is recorded. This number is generally sequential, such that the first game played by the management on any particular day is numbered 1 (and all tickets for this game which are copied by the proprietor-representative would bear the same number) and each game thereafter would bear the following consecutive number. Thus the proprietor can distinguish between a current game and the applicability of the customer's ticket thereto and one which has already been ended. The proprietor-representative prepares the duplicate ticket bearing this game number by marking the numbers, sequences and other instructions as to choice, which the customer had placed on his original ticket, on the duplicate ticket using indelible ink. The proprietor-representative then stamps both tickets (the customer's original and the duplicate) with the calendar date and a serial number. He then hands the copy he has made (with indelible ink markings) to the customer, retaining the customer's original for future reference. It is obvious that either accidentally or deliberately, or through dishonesty, errors can be made or manipulations of the tickets can take place whose significance can be many thousands of dollars to the proprietor. Continuing however, the copy marked in indelible ink, authenticated with date and serial number corresponding to the same stampings on the customer's original, becomes the latter's receipt and evidence of the amount and kind of play.

When the manager of the proprietor's interests decides sufficient business has been transacted for that particular "game," he declares a termination of sales. One of his clerks then collects all of the original customer-marked tickets from all the other clerks and, openly and without protection, places them before the manager. Concurrently, another clerk goes to a "selection platform" where there is a cage-type container within which are, for example, ping-pong balls or similar means, each marked with the number from 1 to 80. The cage construction is that these marked balls are visible from the outside of the cage. The cage has a necked down section which, in conjunction with a release button, permits removal of one ball at a time. Before being withdrawn, the balls are mixed, either mechanically by twirling the cage, or by inducing a jet of air which has a similar mixing effect. The cage may be hand operated or air operated. When the balls are considered sufficiently mixed, to an extent where a random distribution may be reasonably assumed, the clerk at that post begins the "drawing." He removes one ball at a time, calling out its number over a public address system. He thereupon lights up the corresponding number on a large electric board, then places the corresponding ping pong ball on a rack visible to all the customers. Simultaneously, another clerk, upon the announcement of each number selected from the cage, immediately thereafter punches a large hole through the corresponding number of a sheaf of printed but previously unmarked tickets, these being called "cover sheets." These are used, when all twenty drawn numbers are punched, as records of that particular drawing, also to facilitate the customer's comparison of the final drawing to his own selections. The customer does this generally by placing the cover sheet with punched holes over his copy of his own marked ticket. When the drawing is complete (20 numbers) the cover sheet punchings are checked against the drawn balls showing on the rack, and against the lighted numbers on the large electrical board. If any error in punching or lighting is shown, it is corrected and the game is announced as official. Several of the cover sheets are kept for record purposes, several given to the game manager, one given to each clerk, and the rest placed on a counter and made available to the customers for them to use to check against their receipted tickets.

It is possible to acquire very large sums on each game played, and in the case of the proprietor, to lose correspondingly large sums. Whenever a situation such as this may occur, whether it be in respect to the game of Keno or any other transaction, such as situations whereby manipulating records one person or another may unlawfully gain, the temptations for collusion and dishonesty exist and are often irresistible to some people. There are many ways, frequently attempted and often successfully executed, in the case of complex accounting and surveillance systems such as that described in the game of Keno. The methods used to bilk the management and/or the public are often very imaginative and cleverly executed, and if dependence is placed, as is frequently the case, upon the "integrity" or visual surveillance by some manager, the opportunity for collusion or simply oversight always exists. The amounts involved in such dishonest operations against the management and/or the public and the losses to legal government agencies from a tax standpoint, have, as previously stated, involved millions of dollars. Yet at this time, there is no method or apparatus in existence that will assure relief, except for the novel apparatus I teach herein.

To describe how my apparatus can be used, I shall further describe its application to the game of Keno with reference to the following figures of which:

Figure 1:
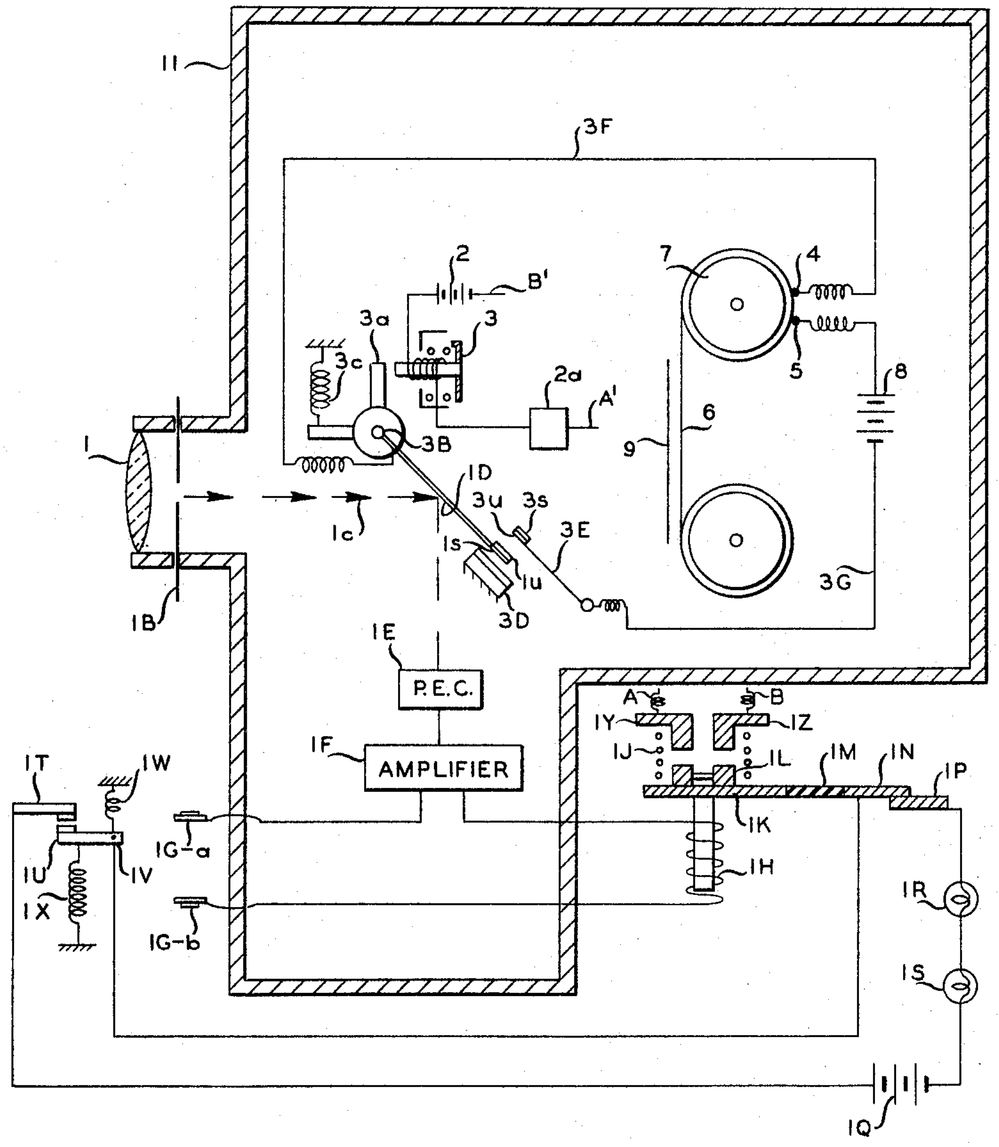
FIGURE 1 is a schematic showing of the camera and wiring diagram of one embodiment of this invention.

Referring now to the drawings, I shall proceed to describe the apparatus of this invention in one embodiment which, while useful in other applications, is particularly useful in the game of Keno since, in this embodiment and application, the complexity and number of functions is considered the greatest. Referring first to FIGURE 1, camera 11, capable of giving single frame exposures and, for convenience, preferably handling an 8 millimeter film, has an optical lens 1 of such focal length and field of view as will permit utilization of the maximum amount of film on each exposure to record an individual record of transaction such as a Keno slip. While this is preferred, in other embodiments, it may be desired that a limited amount of information be photographed from each transaction slip, in which event the choice of lens and focal length would be such as to allow maximum film area exposure of that section of the transaction slip which is of interest. A variable diaphragm 1B which limits the effective aperture of lens 1 is located either between elements of the lens or behind the lens in preferred embodiments, or conceivably could even be located ahead of the lens, although this is not a preferred embodiment. Light passes through the lens and the variable diaphragm as shown by the small arrows 1C, striking a mirrored surface 1D and reflecting therefrom onto a photo-electric cell 1E such as is found commonly in many cameras. The signal from the photo-electric cell is amplified as desired by amplifier 1F. As shown in FIGURE 1, the current output of amplifier 1F is sufficient to actuate a small low-load solenoid or relay device. Optionally, as in many conventional constructions, the output of the amplifier can be communicated to a relay which, upon closing the circuit which it in turn actuates, can, through a separate source of power, furnish an even larger current to actuate solenoids which perform other useful work. In series in the amplified outlet from amplifier 1F are two door contacts 1G–A and 1G–B, whose nature and purpose will be explained hereinafter through reference to FIGURE 2. Also in series with the same amplifier output circuit is a solenoid 1H which, in the particular embodiment shown in FIGURE 1, is shown in a normally open position, being forced into said open position by spring 1–J which is under compression. On the movable element 1–K of said solenoid, there is a surface of conductive material 1–L. As shown, this has two connected contact points, but many other constructions are possible. Also upon movable element 1K is an insulated section 1M and, through such insulation, a second point of conductive material 1N, whereby 1L and 1N are insulated from each other. Conductive material 1N contacts a fixed conductive surface 1P whenever the solenoid 1H is in a normally open position. However, when solenoid 1H is closed (current flowing through the winding), surfaces 1N and 1P are separated. In series in the same circuit, as shown, is a source of power 1Q and either visual audible signal or signals 1R and 1S. In this same circuit there is a door contact 1T and a second movable door contact 1U, which is so arranged that it will pivot about point 1V and once door contact 1T passes it, will spring back tending to remain normally in a neutral or null position because of the equal forces of springs 1W and 1X which are in compression. Door contacts 1T and 1U are so constructed that, upon contacting each other in one direction, current will flow but in the other direction on contacting each other, they are insulated so as not to allow passage of current.

For example, the lower surface of 1T and upper surface of 1U are conductive, whereas the back surfaces are non-conductive. Therefore when, for example, 1T which is mounted on door 29 as are contacts 1G–A and 1G–B (FIGURE 2) comes in contact with 1U on closing the door, contact is made. However as the door is closed, then the contact 1T passes beyond 1U. When the door is opened, the back surfaces of these contacts meet and since they are insulated, no contact is made. Conversely, the contacts can be so arranged that the opposite effect is had.

Co-functioning with, but normally separated from conductive mateiral 1L, and separated from each other, are contact points 1Y and 1Z. When the solenoid connection therewith is closed, connection is established between contact points 1Y and 1Z. Communicating with these are wire leads A and B which for convenience in drawing in FIGURE 1, are shown separated from leads A′ and B'. Thus, contact points A and B form a continuous connection with their corresponding mates A' and B'. Located in series with these leads is a source of electrical power 2, a solenoid (normally open) 3 and a time delay, resetting circuit breaker 2A, the latter being such as is found in many common circuits, a device such that it will initially allow current to pass for a very short period of time, generally less than one second, in applications of this type, whereupon a relay sequence within said circuit breaks the connection, interrupting the flow of current until the next time that an input signal is received. Solenoid 3 upon activation comes into contact with arm 3A which is affixed rigidly to a member pivoting above pivot 3B. Upon activating, solenoid 3 forces arm 3A from its normal position of rest (said normal position being achieved by means which will be described hereinafter) causing it, in the case of the arrangement shown in FIGURE 1, to move through an arc in a counterclockwise direction. Once solenoid 3 deactivates and moves into its normally open position, spring 3C, normally under tension, causes arm 3A to return to its normal at rest position (in the case of FIGURE 1, a movement clockwise). Mirrored surface 1D is also rigidly affixed to the same member bearing arm 3A, such that the same movement causing arm 3A to move will cause mirrored surface 1D to rotate, in the same direction (counterclockwise vs. clockwise) as arm 3A. Mirrored surface 1D, in its normal at rest position, comes into contact with a fixed, nonconducting surface 3D. When mirrored surface 1D moves in a counterclockwise direction, it comes into contact and causes rotation of pivoting contact 3E. Upon such contact of 1D and 3E at such time as 1D is moving in a counterclockwise direction, the surfaces 1U and 3U making contact with each other being insulated, there is an open circuit through which current does not flow. Upon movement of mirrored surface 1D clockwise to its normal at rest position, it again contacts pivoting contact 3E, but this time opposite sides 1S and 3S of each of these members are coming into contact where said opposite sides are conductive material such as to allow closing of the circuit connected therewith. Connected to mirrored surface 1D is a wire lead 3F, and connecting to pivoting contact 3E there is a wire lead 3G. Leads 3F and 3G communicate, respectively with connections 4 and 5. A supply of photographic film 6, carried by conventional spools, is moved on a single frame exposure basis by motor 7, power to which is supplied through contacts 4 and 5 by source of power 8. Located between the sensitized surface of film 6 and the system of lens, variable diaphragm, and mirrored surface is shutter element 9 which will give a preselectable interval of time for light to pass therethrough and strike the sensitized film surface. Such shutter arrangements, co-functioning with electrically driven or spring drive means of rotating film by frame, on a single exposure basis, are common in the photographic trade. Single frame exposure cameras have been used extensively in photographing panels of instruments or in obtaining long-term transient studies where a continuous movement of film is not desired.

I shall now explain the sequence by which camera 11 operates. Light enters lens 1, passes through variable diaphragm 1B and with mirrored surface 1D in the normally closed position is reflected to photo-electric cell 1E, amplified through amplifier 1F. If door contacts 1G–A and 1G–B are open, nothing happens. As soon as door contacts 1G–A and 1G–B are closed, the circuit is activated as previously explained, solenoid 1H moves to a closed position, such that current flows through contacts 1Y and 1Z, activating solenoid 3, rotating arm 3A and mirrored surface 1D in a counterclockwise direction, thereupon allowing light to pass from lens 1 through the opening of shutter and on to the sensitized surface of film 6. Shutter 9 then closes, allowing control of the exposure of the film and, a fraction of a second later, the time delay circuit 2A deactivates solenoid 3 causing mirrored surface 1D to return clockwise to its normally closed position. Film 6 is then advanced to the next frame by conventional means established in camera art and the system is ready to go through the entire sequences once again.

Overriding the sequence as described above, however, is the action of another sequence which monitors against trouble or tampering. One form of tampering might consist of an attempt to obscure the lens in some fashion such that a photograph could not be made because of insufficient light for adequate exposure of the film. Means which might be used to accomplish such tampering would consist of the placing of a sticky opaque material such as gum momentarily on the outside surface of the lens. If this occurs, however, the photoelectric cell 1E does not receive enough light, as a result of which there is insufficient current passing from the output of the amplifier to activate solenoid 1H. In this event, conductive surfaces 1N and 1P continue to remain in contact with each other. The same action which had caused door contacts 1G–A and 1G–B to close, which would normally cause a photograph to be taken, even though there was insufficient light, causes however, door contacts 1T and 1U also to close momentarily. If, at this time, solenoid 1H has not activated, whereby conductive surfaces 1N and 1P are still in contact with each other, the effect is to give a closed circuit in this branch causing warning signals 1R and others such as 1S, or still others if desired, to activate, to ward off tampering. It is in order to explain at this time, even though this point will be covered in greater detail elsewhere hereinafter, that the reason one would, with dishonest intentions, attempt to obscure the lens would be to obtain a defective exposure and thereby claim that an object had been subjected to photographing, and that therefore said object (in the case of the game of Keno, a ticket) had been submitted to the machine but had failed to be recorded properly by the machine, thus establishing a dishonest claim upon the proprietor for a presumably winning ticket, or for other presumably correct information (which had in fact been contrived). By the arrangement shown, however, more specifically by the giving of warning signals through 1R and 1S, it can immediately be ascertained that insufficient light was entering the lens and that, therefore, the camera had been tampered with. Elsewhere it will be shown that if insufficient light enters the lens for other reasons, such as the normal source of illumination of the object to be photographed, failing in some fashion, such as the burning out of a bulb, that this is inself with not create a sequence such as hereinbefore described but will generate still another signal (not shown in FIGURE 1) which would simply tell the proprietor that the source of difficulty was inadequate illumination.

Figure 2:
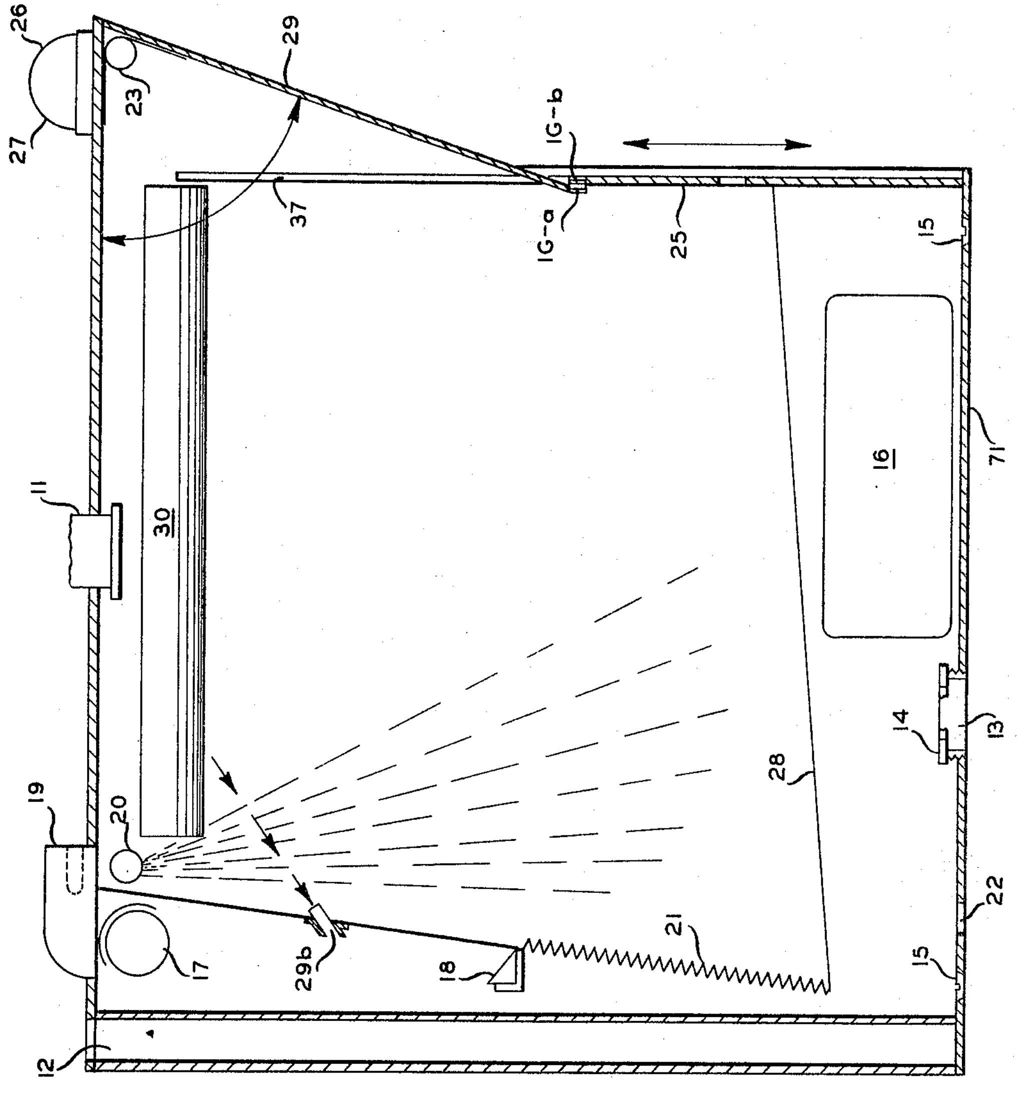
FIGURE 2 is a schematic showing of a data storage and photographing box.

FIGURE 2 is a side view of the Document Enclosure Chamber 71, such chamber preferably being light-tight, that is, such that when swinging door 29 is closed (in its normal position) no extraneous light will enter the chamber from outside. Proceeding now to the description of the construction of the chamber, in the depiction given in FIGURE 2 the swinging entry door 29 is constructed such that it will pivot clockwise to allow opening and insertion of material into the chamber, having a spring 23 such as to restore it to a normally closed position, at which latter time contact point 1G–A on the door comes into contact with contact point 1G–B, the effect of which contacting has been previously described in reference to FIGURE 1. The inside of the Document Enclosure Chamber has, extending into it, some portion of the camera described in FIGURE 1, at least the lens 1 thereof. The mounting of the camera upon the chamber is such as to completely eliminate the possibility of any tampering therewith, as will be described hereinafter by reference to a subsequent figure. A lighting fixture 30 providing a controlled intensity and evenness of illumination is also mounted within the chamber. Co-functioning with said lighting fixture 30 is a photoelectric cell 29B which is calibrated such that if the intensity of light from fixture 30 falls below a pre-established minimum level, a conventional circuit actuates a visible or audio signal to the proprietor or operator of the equipment, whereupon necessary steps can be taken to replace the fixture or otherwise restore the proper level of light. It is important to note that the separation or rather, the *distinction* between inadequate light due to inadequate output from fixture 30, and inadequate light due to tampering with the lens as hereinbefore explained, is made by this arrangement, such that anyone conspiring or colluding in a dishonest attempt to bilk the proprietor cannot claim that an inadequate exposure of film in the camera was due to inadequate lighting, since if the latter were true, the signal activated by a photo-electric cell 29B would have so informed the proprietor. The base plate 28, upon which the material to be photographed, rests, is preferably inclined downward in a direction away from the swinging entry door, so that the tendency of the object to be photographed will be to slide in the direction of plate 21, which is serrated or notched in a manner such as to inhibit the end of the object being photographed nearest said plate 21 from curling upward. Toward this same end, that is to help maintain the object to be photographed in a better position for such photography, an air jet 20 is so incorporated as to force an air stream downward in the direction of plate 28 and by its force, tending to keep the object being photographed in a flattened position. This feature is particularly useful because the objects being photographed are allowed to accumulate in a stack within the Document Enclosure Chamber, if desired, for which same reason, the serrations on plate 21 extend some distance above the surface of plate 28. Located in such a manner as to permit its photographing simultaneously with that of the piece of information being photographed which is on the top of the stack, is a date, time and serial (or game) number meter 18, this being at such a distance as will permit it to be in focus at the same time that the uppermost piece of information within the chamber is in focus and being photographed. Other ways of recording the information obtained from meter 18 will be apparent, such as by placing the meter on an arm pivoting in such a manner as to bring the meter to rest in a position near the surface of the uppermost piece of information within the chamber, where it can also act in the configuration as a means for further holding down or stabilizing the position of the uppermost piece of information. Still other ways can be employed toward this end, which can consist of devices known in the trade which will be located within the camera structure itself, with the information therefrom appearing either in one corner of the film or as a light overlay over the information being photographed. Receptacle 19 receives the contact connections from the camera described in FIGURE 1, and further described in subsequent figures. Warning light 27 advises the proprietor or operator that the supply of unexposed film is near depletion. Warning light 26 which is in circuit with photo-electric cell 29B advises, similarly, when the light output of fixture 30 is inadequate. A transformer 16 may be employed and built into the Document Enclosure Chamber in a convenient manner, such as in an area between inclined plate 28 and the base of the Document Enclosure Chamber. Means are provided, such as screws 15, or if desired bolts whose permanent affixing can be secured by locks, either measure being in order to secure the document enclosure chamber to a secure fixture. An important feature of wiring access entry 13 is that upon receiving the cable end of the wiring entering the Document Enclosure Chamber, the connection thereto can be secured and locked to prevent tampering. Entry 22 provides for admission of compressed air and communicates with air jet 20. A double wall section 12, consisting of translucent or transparent material such as plastic sheets, if desired, having surfaces such as to give diffused light, are so arranged as to allow insertion thereinbetween, of various types of information, including sections which would light up upon various signals (such as defective lighting from fixture 30 etc.) or which can be made to bear advertising copy, illumination thereto being supplied by a source of light 17.

A very important feature of the Document Enclosure Chamber consists of sliding door panel 25. At such time as the operator of this equipment desires to remove the information contained or stacked within the chamber, he may slide panel 25, upward in the embodiment shown. By virtue of the pivotal nature of swinging door 29, this will cause 29 to rotate inward, thereupon *breaking contact points 1G–A and 1G–B*. The effect of said breaking of said points is therefore comparable to that of the normal opening of the swinging door 29 when individual pieces of information are inserted in the chamber. However, when the operator removes the information accumulated within the chamber and thereupon restores sliding door 25 to its normal position, this will cause swinging door 29 to return to its normally closed position, contact points 1G–A and 1G–B will again come into contact with each other, and the camera will be activated to take an exposure. However, at this time, since there are no pieces of information within the chamber, said exposure will be a "blank." This serves an important and very valuable service to the proprietor—one which further assists him in his accounting procedures and avoidance of any accidental or deliberate tampering because it makes a distinct separation between all the information in one group (or game, in the case of Keno) and that in some subsequent group. If desired, and toward the same end, the inside surface of inclined plate 28 can be lettered with the words "end of group" or "end of game" or similar intelligence intended to convey evidence of completion of some group or sequence of grouping. In similar fashion, at the time the operator removes the accumulated information he can insert a card bearing any other useful information, such as to lay flat upon the surface of plate 28, such as "end of deed recordings of January 5, 1958" or "end of game 36," or even instructions to those viewing the film at a later date as to circumstances unique to that particular group of information or common to several groups. The important point to note is that the method by which this can be done constitutes one which will not cause erroneous interpretation that the blank exposure was due to any improper acts on the part of the operator.

Figure 4:
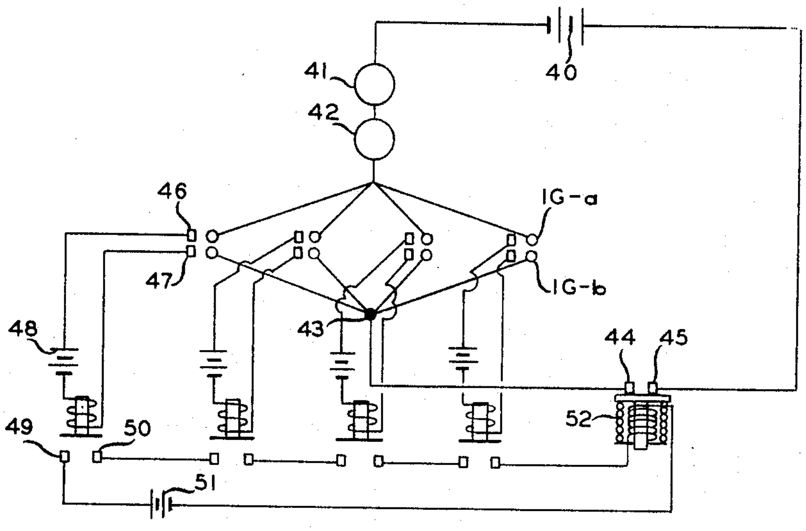
FIGURE 4 is a schematic electrical diagram of one method of intertwining the camera and data storage box.
Figure 3:
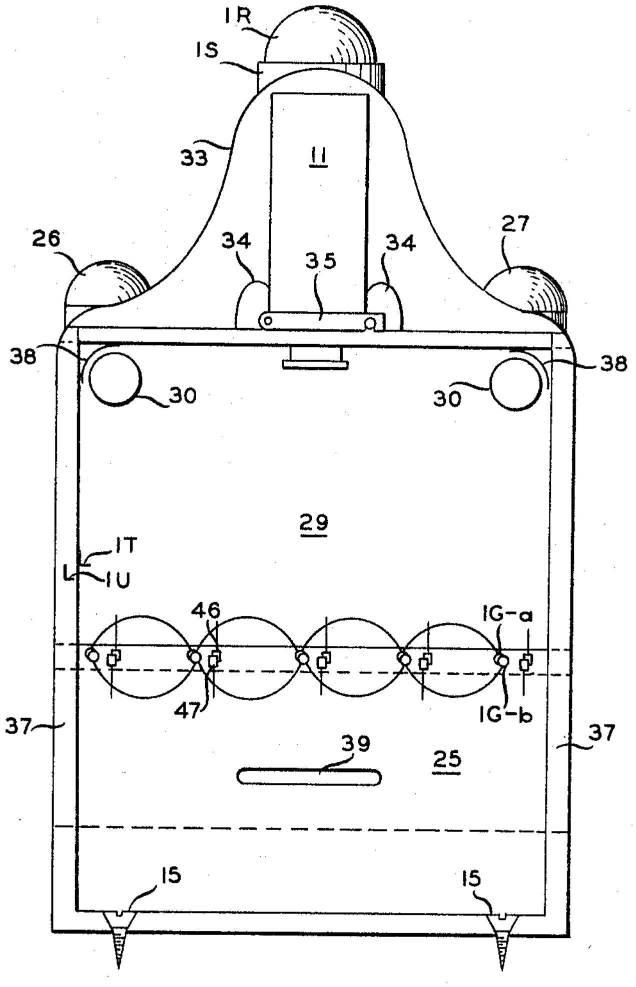
FIGURE 3 is a view showing schematically the arrangement of the camera in the data storage box and is illustrative of the co-operativeness of the two elements.
Figure 5:
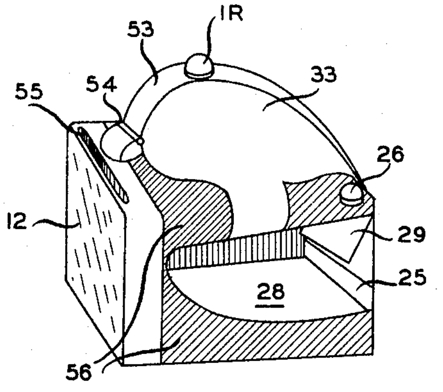
FIGURE 5 shows a view of the camera enclosure housing.
Figure 5B:
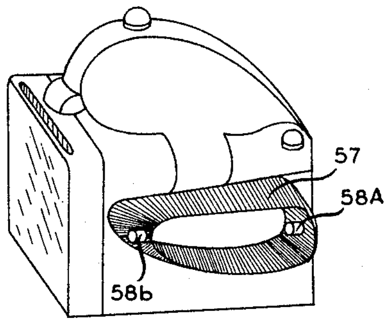
FIGURE 5B is another view of the camera housing enclosure showing an alternative arrangement and, FIGURE 6 shows schematically the co-operative combination of elements to accomplish all of the objectives of this invention in relation to the game of Keno.

FIGURE 3 shows a front elevation view of the Document Enclosure Chamber, the positioning of the camera and other features. The reference to means 15 for securing the Document Enclosure Chamber permanently to some other fixture, the sliding panel 25, the swinging entry door 29, the lighting fixture 30, the warning lights 26 and 27, and the camera 11 have already been explained in reference to FIGURE 2, and the camera 11 shown in FIGURE 3 has been referred to in both FIGURES 1 and 2. The warning signals 1R and 1S, or such other additional signals as desired, which may be at different locations in the proprietor's establishment, or as still another feature, which may communicate a signal to an overall monitoring organization operation in behalf of one or more proprietors, have been referred to in FIGURE 1. Additionally, FIGURE 3 shows means 39, such as a bar or a handle for raising sliding panel 25, channel 37, on either side of the sliding door 25, wherein said sliding door moves and is restrained in the direction of its travel, means 38 for augmenting or reflecting light from lighting fixture 30 or otherwise focusing it in a desired area, preferably such as to give even illumination, channels or guides 34 wherein the camera can be slid forward and backward, so as to remove or properly position it, with the final in-place positioning being when it has been inserted far enough for its electrical connection to engage the jack receptacle 19 shown in FIGURE 2, a suitable light-tight and tamper-proof camera enclosure 33, means 35 for locking the camera in its correct operating position and preventing the removal thereof, through means such as a lock and key, by unauthorized personnel and electrical contacts IG–A, co-functioning with the electrical contacts IG–B shown in FIGURE 2. The nature and functioning of all these features are apparent and will not be discussed, except for the case of a special feature related to electrical contacts IG–A (and the corresponding contacting points IG–B). First, however, it is necessary to review one of the requisites, namely that the surreptitious dishonest insertion or removal of information being photographed must be prevented, as must any devious techniques for circumventing this feature. As illustration of the point I wish to make, if contact 1G–A was a single point contact, possibly located near the middle of sliding door 29 (along its edge), and the corresponding contact 1G–B were a single point contact, it might be possible for the dishonest operator so to bend the sliding door so as to create an opening through which he might surreptitiously insert or remove information being photographed, while still allowing contact points 1G–A and 1G–B to remain in contact with each other. One way to avoid this problem would, of course, be to construct both the swinging entry door 29 and sliding panel 25 of such material and in such manner that bending thereof would be impossible. While I recognize and hereby teach such means of avoiding bending, since in some applications of the invention, they may be useful and provide the full desired amount of protection, I nevertheless recognize that in other applications they, too, would be inadequate, since the dishonest operator could, unnoticed, perhaps while the establishment was closed for business, during off hours, file such rigid material or otherwise cause, at some point removed from the contact points, an opening to be created without bending or breaking either of the di-functioning members. To avoid this possibility, I have devised still another and very important feature and construction. This consists of having a plurality of point contacts distributed along the edge of swinging entry door 29 (these in effect constituting the previously mentioned contacts 1G–A), said plurality of point contacts being electrically in series with each other whereby, if any one or more of the individual point contacts did not make a connection, the circuit between the entire series would be open, whereby the invention would be restrained from photographing the information at that time. It can be seen from this, that if an attempt were made to bend one corner, the contact at that corner would be open, or if an attempt were made to file away along one side of swinging door 29, the contacts in that area would remain open and the safety feature conceived by me would be in effect. It will be evident that, for this arrangement of a series of individual contact points, the leads communicating therefrom to the other equipment co-functioning therewith would be located at the extreme ends of the series of contact points, so that if either of the contacts at the extreme ends or any intermediate are broken, the safety feature is functional. I also recognize still another added feature which can be employed if desired by the proprietor, or if the environment under which the invention will be operated is such as to inherently pose a greater danger of acts of dishonesty. This feature consists of a separate circuit, supplied with a separate source of power and, in its entirety, being related to the co-functioning characteristics of the contact points 1G–A and 1G–B, such that if *any* of the contact points come into contact with each other and, at the same time, *any* others do not, a warning signal will be created which the proprietor and manager, or other monitoring organizations, can immediately accept as evidence of tampering with the Document Enclosure Chamber. FIGURE 4 shows one of the possible circuit arrangements for achieving this feature, consisting of two separate but co-functioning circuits. I shall first describe one of these circuits. A source of power 40 communicates in series with a warning signal 41 and, in series, with other warning signals if desired, 42. Continuing with this circuit, it then branches to the individual point contacts along the edge of the swinging entry door which has previously been referred to as 1G–A. These co-function with contact points 1G–B which then communicate and meet at common junction point 43, thereupon to contact points 44 and 45 which are separated and which, by their separation, create a break in the continuity of the electrical circuit. This same circuit, as shown, continues and closes by returning to the source of electrical power 40. The second circuit in FIGURE 4, co-functioning with that just described, consists of a separate set of contact points 46, one for each of the contact points 46 also being mounted on the edge of the sliding entry door. Co-functioning with contact points 46 are contacts points 47, their distribution and relationship to contact points 1G–B being similar to that previously described for the relationship of contact points 46 to contact points 1G–A. Each contact point 46 comes into contact with a corresponding contact point 47 when the sliding entry door 29 is closed, and are tied into a circuit consisting of a separate (for each pair of contact points) source of electrical power 46 communicating with a solenoid which, in the embodiment shown is normally open when contact points 46 and 47 are not in contact with each other. As shown, for each pair of contact points 46 and 47 there is a separate circuit as just described. When these solenoids are energized they move in a direction such as to close and allow current to flow between contact points 49 and 50. The branch circuit related to contact point 49 and 50 contains its own source of electrical power 51 and a solenoid 52 which is normally closed in the particular embodiment shown. Thus if any one of the pair of contact points 49 and 50 remains open, by virtue of the fact that the solenoid is not energized, which in turn would be due to the fact that contact points 46 and 47 are not in contact with each other, the net effect is to create a break in the circuit related to contact points 49 and 50 at one or more points where such pairs of contact points exist, which in turn prevents solenoid 52 from being energized, leaving it in its normally closed position. I shall now explain how this entire circuit sequence of FIGURE 4 functions. Assume the door 29 is closed, that each of the contact points 1G–A contacts its corresponding mate 1G–B, and that correspondingly each of the contact points 46 contacts its mate 47. Current will then flow from source of power 40 through contacts 1G–A and 1G–B, past contacts 44 and 45, because these last are now "bridged" so as to provide electrical continuity by the fact that solenoid 52 is closed and making contact with both 44 and 45, and current can flow and activate alarms 41 and 42, *were it not for the functioning of the second circuit.* Under the circumstances just described, where each of the contact points 46 contacts its corresponding mate 47, the circuit containing source of power 51 and the series of contact points 49 and 50 is complete, solenoid 52 opens, breaking the connection between contact points 44 and 45, thereby preventing the warning signals 41 and 42 from activating. It is reiterated that this will occur only if every contact point 46 comes into contact with its corresponding mate 47. In the event any one of the combinations of 46 and 47 which would normally come into contact with each other remain open, the circuit containing 49 and 50 is broken at that point and solenoid 52 remains closed maintaining an electrical bridge between contacts 44 and 45. Under this circumstance, even if any of the other pairs of contacts points 46 and 47 is closed, however, current will flow through the corresponding circuit and cause the warning signals 41 and 42 to activate. FIGURE 5 shows another view of the camera enclosure housing 33, light 26, swinging entry door 29, sliding panel 25, inclined plate 28, translucent or transparent panel 12, and warning light or buzzer signal 1R have already been described in nature and function. In the particular construction shown, the side panel, No. 33 herein, of the camera enclosure is fixed, while the top piece 53 of the enclosure is movable, swinging upward and in an arc about pivot 54. As previously stated, the construction of the camera enclosure, particularly a movable portion 53 thereof, can be locked or otherwise secured to prevent unauthorized entry into and removal and manipulation of the camera. 55 is the upper fingerhold for upward removal of an insertable panel carrying advertising, instructional or other information as previously described. Referring now to side panel 56, which also wraps around part of the top to the Document Enclosure Chamber in the particular construction shown, several optional constructions are possible. For one, the entire panel can be solid, lightproof, and opaque to outside view. In the event of such a construction the interior of the Document Enclosure Chamber in the particular view shown in FIGURE 5 would of course, not reveal from this angle of view either the swinging door 29, sliding panel 25 or inclined plate 28. All that would appear in this event would be a solid panel. Another construction possible would be one such that a section of side panel 56, securely affixed thereto and made a part thereof, and not movable, would be made of transparent or semi-transparent material, such as to allow inspection from the outside of the contents of Document Enclosure Chamber without requiring entry through either the swinging door 29 or sliding panel 25. Such a construction would be useful in that the operator of this equipment or the manager, or some other person performing surveillance, would be able to tell more readily how high the stack of accumulated information (in the case of the game of Keno, tickets) had accumulated within the Document Enclosure Chamber, and thereby tell more readily when to terminate that particular accumulation of information (or in the case of the game of Keno, to terminate the sales for that particular game). In the event of such latter construction, wherein such outside inspection can be made without entry into the chamber, certain other features of construction would be desirable, and would be readily apparent to one skilled in the art, whereby it would be impossible for someone to shine a light upward into the enclosure chamber (from the outside) such as to shine upon the lens and cause excessive light exposure, thereby spoiling the particular frame of film being exposed at that time. Such constructions to prevent this from happening could include suitable baffles within the chamber or a long outward projection from the side of the chamber as shown in FIGURE 5B and referred to thereon as a funnel hood 57. This important feature, in the event outside inspection without entry into the chamber is desirable, extends outward in the case of the view shown in FIGURE B in a forward direction, a sufficient distance to make it extremely difficult for one to reach inside up to the point of the transparent panel and shine a light in the direction of the lens. As a further safeguard against any attempt of this type, and even with the construction 57 just described, a photo-electric cell and light beam construction 58A and 58B may be incorporated such that if any foreign object is inserted, it would break the light beam and cause a warning light or audio alarm to activate.

Figure 6:
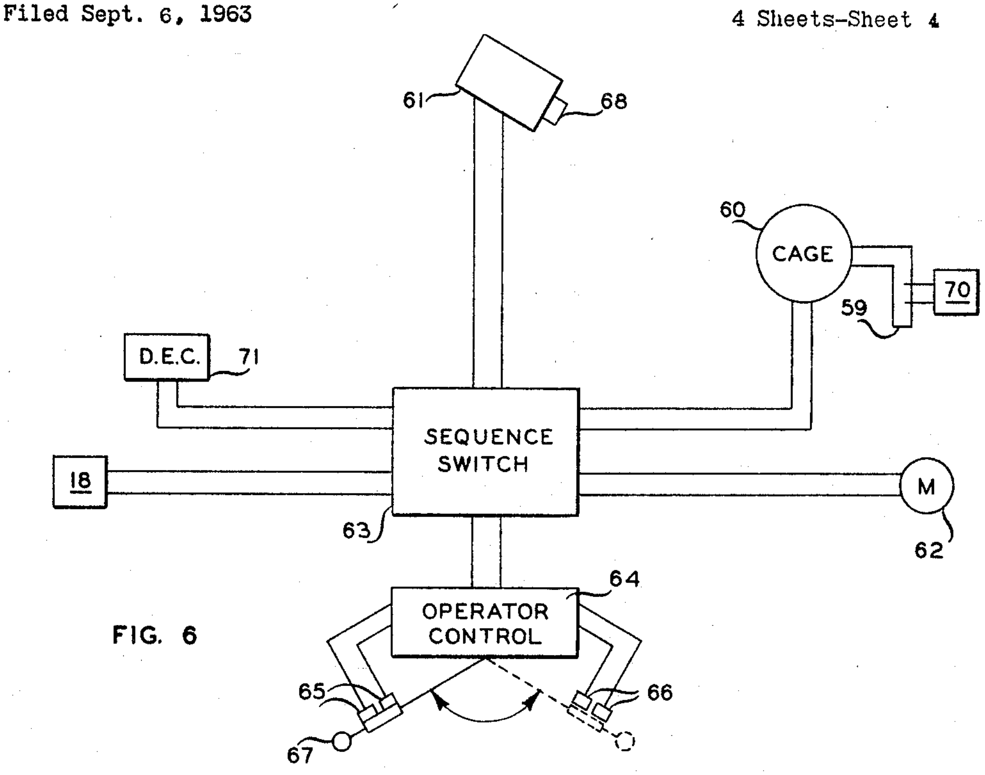

FIGURE 6 shows a schematic layout of various major elements of the Method and Apparatus. Shown thereon is a sequence switch 63, connected with which in a manner which will be described as cage enclosure 60, the Document Enclosure Chamber of FIGURE 1, a secondary movie camera 61 (not the same camera contained in the Document Enclosure Chamber) a special secondary activating switch 62 for activating the shutter and film advance mechanism of the Document Enclosure Chamber camera and an operator's manual control 64. Control 64 incorporates a two-position lever (preferably) such that at one extreme of its travel it will contact and close the circuit between contact points 65 and in the other extreme position of its travel will contact and close the circuit between contact 66. The sequence switch 63 is of a type commonly used in electrical and electronic sequence operations, whose construction will readily be apparent to one skilled in the art. I shall now describe a typical sequence wherein the entire assemblage shown in FIGURE 6 will function.

The operator throws switch 67 in one direction, for example closing contacts 65. Upon his so doing the sequence switch 63 is energized in such a manner to cause the following sequence of events to take place.

(1) The Document Enclosure Chamber light for illumination of the information photographed goes out.

(2) Special switch 62 trips the shutter of the Document Enclosure Chamber once more, and advances the film one exposure, thereby giving one "blank" frame (or several blank frames if desired by proper selection of special switch 62).

(3) Counter 18 is contained in the Document Enclosure Chamber camera advances to the next sequential date, serial or other sequential numerical recording (in the case of the game of Kena, to the next game number).

(4) Movie camera 61 (a camera separate from that contained in the Document Enclosure Chamber, and operating continuously as a conventional movie camera) starts and, being focused on the operator removing the balls from cage 60 begins photographing his action and behavior.

(5) Upon starting, camera 61 first records, through counter 68, which is similar to counter 18 in the information it carries, the information recorded by counter 68 at this time (that which had just previously recorded by counter 18 prior to counter 18's having advanced as described in step (3) immediately above). In other words, if the information on counter 18 which had been recorded immediately prior to the Document Enclosure Chamber light going out, as described in (1) above, had recorded the sequential number "3" then, at this time, upon this particular sequence of activation, the counter 68 in camera 61 would also record the number "3," thus allowing correlation of the movie film thereupon being exposed to that which had just hitherto been exposed in the Document Enclosure Chamber.

(6) The automatic lock on cage 60 is then released, permitting the cage to be rotated.

(7) The visible electric board lights up (also showing the number just previously recorded by the Document Enclosure Chamber camera, this being the number "3" in the example just cited).

When switch 64 is moved manually by the operator in the opposite extreme direction, for example when it closed contacts 66, the following sequence takes place:

(8) The cage locks and cannot thereafter be rotated.

(9) Camera 61 stops and counter 68 connected therewith advances to the next number.

(10) The illumination light for photographing information lights up in the Document Enclosure Chamber.

An important and separate feature of the invention is means 59, shown in FIGURE 6, for avoiding dishonest manipulation or tampering with the contents of the cage-enclosure, or the selection of an excessive and improper number of balls (in the case of the game of Keno, over 20 balls) therefrom during any one game or the attempt on the part of the operator of the cage-enclosure to claim to have removed the correct number (20) of such balls whereas in fact he hadn't and had, perhaps, cached a ball not properly one within the cage-enclosure at the beginning of the game and had attempted to claim that such spurious ball was in fact one of the 20 which would have properly been taken from the cage-enclosure. It will be recalled that in prior reference to cage 60 it was stated that such cage had a necked down section through which only one ball wound pass at a time upon being removed from the cage-enclosure. The novel construction that I teach in respect to means 59 consists of a finger type mechanism 72, which protrudes into the necked down section of the cage-enclosure in such a fashion that, upon removal of a single ball therefrom the finger deflects and, upon said deflection activates an electrical counter 70 and records the removal of said ball, said sequence repeating itself up to 20, with the counter recording the total number of balls removed whereupon, having counted 20 balls removed from the cage-enclosure, a visual or audio signal is activated so as to clearly indicate to the operator, proprietor and customer-viewers that 20 balls have in fact been removed. At the same time the finger mechanism locks in place by virtue of a suitably actuated solenoid or similar device, such that no more balls can be removed for that particular game. Subsequently, when the operator control is moved in the direction such as to lock cage 60 and light the photographic exposure light in the Document Enclosure Chamber, the means 59 reset, through a command signal received from sequence switch 63 such as to be ready to perform the same functions as hitherto described upon the commencement of the next game.

Having described the apparatus of my invention in the foregoing material in the six figures of drawings used therewith, I shall now illustrate, again by reference to the game of Keno the various individual problems or actions which can take place, either deliberately or accidentally, either through dishonest intent, collusion, or other irregular behavior, on the part of customers, employees or even the proprietor himself, and combination of customers and clerks. Having described each problem, I shall then describe the solution to said problem as is afforded by the apparatus of this invention, thereby illustrating the novel features upon which the invention is based. Those skilled in the art will realize that the problems and solutions shown are illustrative only and the invention is not limited thereto. Other features and advantages of my invention will be apparent from the foregoing description and will further be suggested by the following examples.

*Problem 1*

Assume the situation where tickets are given by the proprietor or clerk to the customer, such customer being in collusion with the clerk, where said tickets are in total or partial blank, but where said tickets bear the proper date and serial number stamped thereon. This situation would permit the customer and clerk in collusion to mark the tickets after the balls are drawn, with the winning numbers which would be known at that time, thereby assuring a winning ticket in any amount desired.

*Solution to problem 1*

The situation described is made impossible by the invention by recording the fact that the dishonestly claimed winning ticket was not a bona fide winning ticket. This evidence would be shown by the photographic record through the absence of a photograph of said winning ticket in the proper sequence for that game. Alternately, if the dishonestly claimed winning ticket was at any time placed within the Document Enclosure Chamber and photographed, then irrefutable record would exist that said ticket had, at the time of submittal, been submitted in partial or total blank, thereby voiding all rights to payment therefor.

*Problem 2*

Before describing this problem, it should be explained that at the time the clerk makes a duplicate ticket with indelible ink, he ordinarily then stamps the time and serial number of the ticket on both the customer's original and the duplicate ticket. Now, assume that tickets are written by the clerk which bear the printed number of a previous game, and that the clerk by manipulation of the hand stamp sets back the time and serial number to correspond with the time and serial numbers which were current during said previous game. Since the clerk, in this attempted collusion, is attempting to create the impression that the ticket he is then preparing was one that had previously been prepared, for an earlier game, he already has knowledge of what the winning numbers would pay for said previous game. Having dishonestly altered the ticket as described above, he can then mark in indelible ink said ticket with said winning numbers and claim a winning ticket. It will be recognized that the same kind of situation can occur in other business endeavors, in the recording of deeds, sales of controlled drugs, sales transaction slips, brokerage transactions and many other forms.

*Solution to problem 2*

The apparatus would establish the fact that it is an incongruity since the Document Enclosure Chamber records the proper time and other sequential numerical information such as game number of a film record simultaneously with photographing of the ticket. If the dishonest attempt described above were made, by reference the photographic record for that particular game sequence it would be immediately apparent that the dishonestly claimed winning ticket had not *in fact* been recorded at the time it was supposed to have been issued.

*Problem 3*

Assume that one clerk handling the balls is in collusion with the clerk doing the punching of the cover sheet and that the two in turn, are in collusion with a customer. The clerk handling the balls attempts to establish that a number has been drawn from the cage which is not truly that drawn. This clerk lights the board with the improper number, and the clerk punching the cover sheet correspondingly punches said improper number.

*Solution to problem 3*

The feature of having the motion camera focused on the necked section of the cage, in the requisite that the correct balls be exposed to the camera, will preclude manipulation on the part of the clerk at this point. If the clerk attempts to light the board with an improper number, the same or a supplementary camera (if desired, exposing on the same film) also shows the lighting of the board.

*Problem 4*

Extraction of sheafs of tickets by a clerk and pocketing of the corresponding sum of money played thereon prior to the audit performed by the proprietor's auditors at the end of the day. This is a leak that has amounted to very large losses either to the proprietor or to civic, State and Federal taxing agencies or to both.

*Solution to problem 4*

The Document Enclosure Chamber camera records every transaction and the sum of money represented by each, whereby an accurrate audit can be made and any discrepancies noted between the recorded amount and that turned in by the proprietor's representatives.

*Problem 5*

In action by the clerk handling the tickets of withholding some of the tickets and not submitting them to the proprietor at the end of the game, with the intention of altering the markings or amounts played on said tickets, then claiming to have forgotten the aforementioned in the den in which tickets are normally collected, or claiming that they were dropped or mislaid accidentally.

*Solution to problem 5*

The Document Enclosure Chamber photographs and records all legitimate tickets.

*Problem 6*

Attempts to tamper with, put numbers over the electrical circuit connections negate or cause improper operation of the circuitory of this invention.

*Solution to problem 6*

All wiring leading to the apparatus and all elements which might be subject to tampering are either concealed, imbedded in protective conduit or other means, or having warning circuits associated therewith.

*Problem 7*

The clerk or proprietor's representatives or others attempt to create time lags or alter the sequence of the ending of the game and the beginning of each operation.

*Solution to problem 7*

Sequence switch 63 described in FIGURE 6 is completely unavailable and unaccessible in respect to its inner workings to anyone except the propietor or a monitoring organization. By virtue of having the sequence controlled by switch 63, and this is an important feature, there is nothing that the operator of operator control 64 can do to said control 64 which would affect the proper sequence of events.

*Problem 8*

Clerk attempts to manipulate a ticket into the Document Enclosure Chamber in such a manner as to avoid having a picture taken.

*Solution to problem 8*

The features described in reference to FIGURE 3 and FIGURE 4 prevent this act of dishonesty.

*Problem 9*

Clerk attempts to insert a ticket into Document Enclosure Chamber after the game, and claim that it had been introduced before the game started.

*Solution to problem 9*

Upon the starting of the game (freeing of the cage) the time and serial number counter 18 of the Document Enclosure Chamber immediately changes number, the light within the chamber goes out, a blank exposure of film takes place, and any attempt on the part of the clerk to insert a ticket thereafter would be useless.

*Problem 10*

Clerk attempts to obscure the lens and claim a faulty picture.

*Solution to problem 10*

This has already been described. If an inadequate amount of light passes through the lens when the camera is supposed to record, warning signals to this effect are activated.

*Problem 11*

Clerk claims that a ticket inserted in the machine was legitimate but that the machine had run out of film.

*Solution to problem 11*

The shortage of film is announced prior to its exhaustion.

*Problem 12*

Clerk claims that the lighting fixture in the Document Enclosure Chamber burned out.

*Solution to problem 12*

The light output of the lighting fixture is monitored by a photo-electric cell and if it drops below a predetermined level a warning signal to this effect is generated.

*Problem 13*

Clerk claims that a ticket was legitimate but that the camera was not properly secured.

*Solution to problem 13*

The camera must be securely locked in proper position and its receptacles engage the receptacles of the Document Enclosure Chamber before the cover can be locked and secured. Additionally, if desired (and this feature has not hitherto been described in the above disclosure) upon closing of the circuitry (making of contact between the camera and the Document Enclosure Chamber receptacle) a "green light" or similar visual signal can be activated.

*Problem 14*

Clerk attempts to learn the results of the drawing and, after results are known, write a winning ticket.

*Solution to problem 14*

The time history of the falsely claimed winning ticket, and its obvious late time, are evident because, upon the starting of the game (from which the clerk or other person may attempt to derive useful number), the recording in the Document Enclosure Chamber ceases and the other features previously described provide protection. In effect, only one section of the system is operative at a time, either the Document Enclosure Chamber or the cage, but never both at the same time.

*Problem 15*

Clerk attempts temporarily to shut down the recording section (Document Enclosure Chamber) of this invention in order first to get the results of the drawing then switch back to the recording device.

*Solution to problem 15*

It will be obvious from the previous description of the invention that this attempted deceit cannot be practiced successfully. The ending of a given game sequence is clearly recorded.

*Problem 16*

A proprietor attempts to manipulate the amount taken in to avoid tax payments.

*Solution to problem 16*

Not only can the correct income be audited by civil auditors but also by government tax people is desired, because there is a permanent irrefutable record of the total money transacted.

*Problem 17*

Different types of records, or records going to different people after their recording, are to be photographed in the same Document Enclosure Chamber, yet must be kept separate either because of confidentiality or for accounting reasons.

*Solution to problem 17*

My invention provides for this by allowing the removal of one camera and insertion of another, so that different groupings or different departmental records can be kept separate.

My invention has been extensively described in relationship to the game of Keno. However, those skilled in the art will see many applications of this invention upon being given this disclosure.

I claim:

1. In a camera adaptable to single frame exposure upon a sensitized film and having a lens positioned to focus an image upon said film, the improvement comprising a reflective surface interposed between said lens and said film to deflect light passing through said lens away from said film, said reflective surface being moveably mounted, photocell means positioned in said camera to receive light reflected from said reflective surface, means responsive to said photocell means adapted to move said reflective surface out of the path of light passing through said lens, means for activating said camera, and means for advancing said film when said camera is activated.

2. In a camera adaptable to single frame exposure upon a sensitized film and having a lens positioned to focus an image upon said film, the improvement comprising a reflective surface interposed between said lens and said film to deflect light passing through said lens away from said film, said reflective surface being moveably mounted, photocell means positioned in said camera to receive light reflected from said reflective surface, means responsive to said photocell means adapted to move said reflective surface out of the path of light passing through said lens, signal means responsive to said photocell means adapted to signal when said photocell means is receiving light of a density below a predetermined level, activating means comprising at least one set of electrical contacts operatively connected with said means to move said reflective surface, and means adapted to advance said film when said camera is activated.

3. A document recording apparatus comprising in combination an enclosure, a camera mounted in one side of said enclosure, document holding means spaced from said camera at the focal length of the lens of said camera, said camera being adapted to single frame exposure upon a sensitized film and having a lens positioned to focus an image of said document upon said film, a light source in said enclosure, moveably mounted reflective surface means interposed between said lens and said film adapted to deflect light passing through said lens away from said film, photocell means positioned in said camera to receive light reflected from said reflective surface, means responsive to said photocell means adapted to move said moveably mounted reflective surface out of the path of light passing through said lens, moveable door means for allowing insertion of a document into said enclosure, means for activating said camera responsive to closing of said moveable door means, and means for advancing said film when said camera is activated.

References Cited by the Examiner

UNITED STATES PATENTS

| | | | |
|---|---|---|---|
| 1,934,484 | 11/1933 | Camilli | 88—24 X |
| 2,930,296 | 3/1960 | Simjian | 88—24 X |
| 2,980,223 | 4/1961 | Stidham | 88—24 X |
| 3,010,361 | 11/1961 | Pfaff | 88—24 |
| 3,179,000 | 4/1965 | Bolsey et al. | 88—24 |

NORTON ANSHER, *Primary Examiner.*

R. A. WINTERCORN, *Assistant Examiner.*